L. WYGODSKY.
VALVE.
APPLICATION FILED AUG. 22, 1917.

1,368,315.

Patented Feb. 15, 1921.
2 SHEETS—SHEET 1.

WITNESSES:

INVENTOR.
BY
ATTORNEY

L. WYGODSKY.
VALVE.
APPLICATION FILED AUG. 22, 1917.

1,368,315.

Patented Feb. 15, 1921.
2 SHEETS—SHEET 2.

INVENTOR.
Leon Wygodsky
BY
ATTORNEY

UNITED STATES PATENT OFFICE.

LEON WYGODSKY, OF BALTIMORE, MARYLAND, ASSIGNOR TO BALTIMORE OIL ENGINE COMPANY, OF BALTIMORE, MARYLAND, A CORPORATION OF DELAWARE.

VALVE.

1,368,315.  Specification of Letters Patent.  Patented Feb. 15, 1921.

Application filed August 22, 1917. Serial No. 187,522.

*To all whom it may concern:*

Be it known that I, LEON WYGODSKY, a citizen of the United States of America, and resident of Baltimore, Maryland, have invented certain new and useful Improvements in Valves, of which the following is a specification.

My invention relates to improvements in valves, particularly valves for compressors, pumps, etc.

The improved valve herein described is entirely automatic in action, may be arranged to open with suction and close with pressure, or vice versa, and so is adapted for use either as an admission or as a discharge valve, is quick in action, presents large port area, and acts with a very small pressure differential. Other advantages of my improved valve will appear hereafter.

My invention comprises a valve cage having one or more rows of lateral ports, in connection with a valve, (preferably one valve for each such row of ports) consisting of a hoop or band of thin spring material embracing such row of lateral ports, and normally closing such ports because of its own inherent elasticity, but adapted to open upon slight increase of pressure from within. The valve opens like a hoop (the band composing such valve being split at one point in its circumference) the ends of the band separating slightly as the band opens, and closing together again as the band contacts in closing. The valve cage is provided with suitable retaining means which hold in place the said valve-band or bands. Other features of my invention will appear hereinafter.

The objects of my invention are to improve and simplify valves for compressors, pumps, etc., particularly valves for blowing engines and other valves which, desirably, are automatic in action and are to operate with a small pressure differential.

I will now proceed to describe my invention with reference to the accompanying drawings, in which one form of valve embodying my invention is illustrated, and will then point out the novel features in claims.

Figure 1:
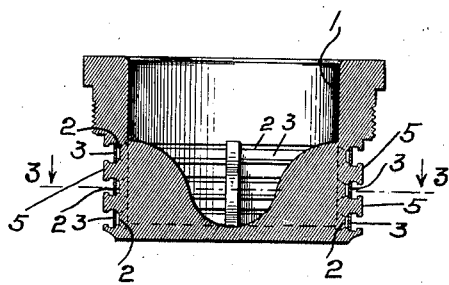
Figure 2:
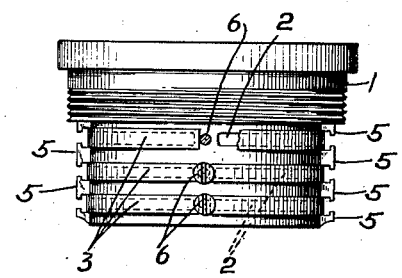
Figure 3:
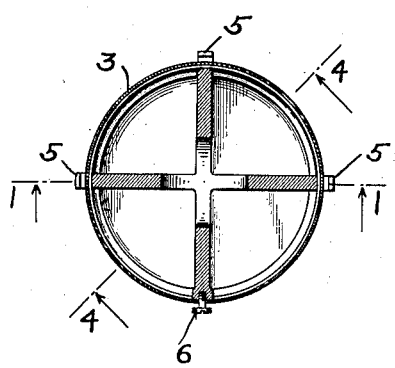
Figure 4:
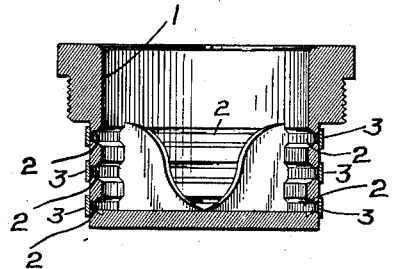
Figure 5:
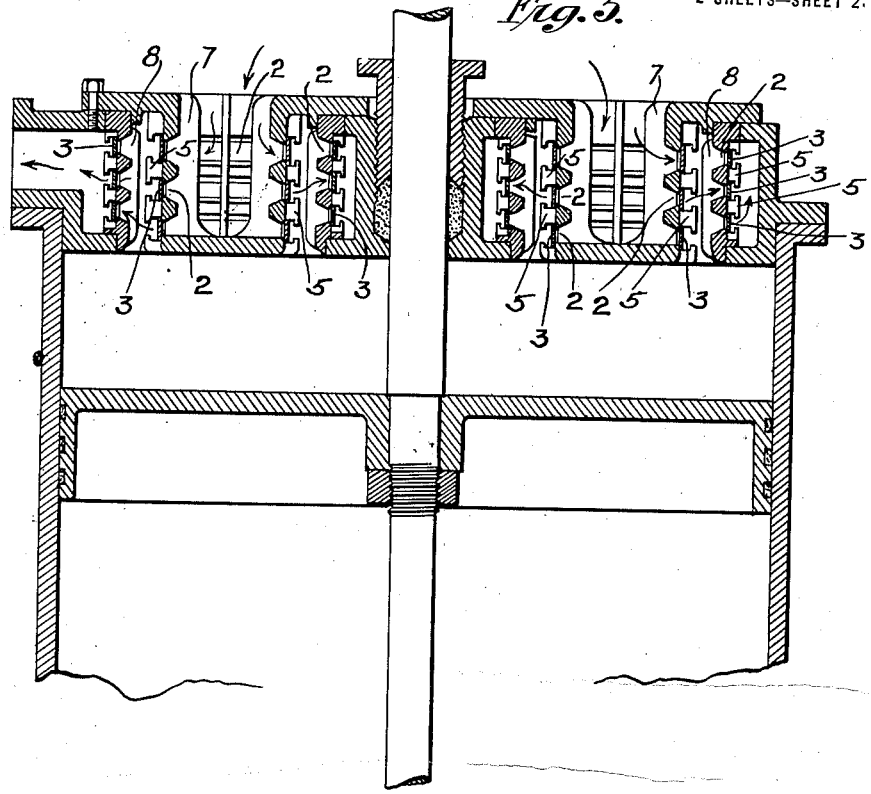
Figure 6:
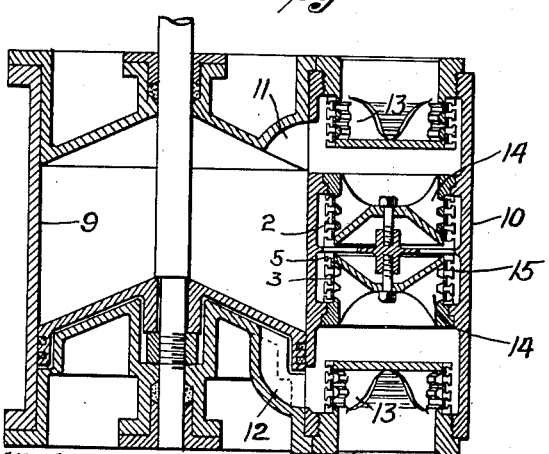

In the said drawings:

Figure 1 shows a central vertical section of one form of my improved valve, the section being taken on the line 1—1 of Fig. 3; Fig. 2 shows a side elevation of the valve shown in Fig. 1; Fig. 3 shows a transverse section of the valve on the line 3—3 of Fig. 1; and Fig. 4 shows an axial section of the valve on the line 4—4 of Fig. 3; Fig. 5 shows a fragmentary axial section of one end of the compression cylinder of a blowing engine, and shows concentric inlet and discharge valves of my invention in the head of that cylinder; and Fig. 6 shows a longitudinal section of a compressor or pump cylinder provided with another arrangement of inlet and discharge valves according to my invention.

Referring first to Figs. 1-4 inclusive. .1 designates a suitable valve cage, consisting of a hollow bushing having a plurality of rows of peripheral ports 2; and 3, 3 designate spring valve-bands, one for each such row of ports. A plurality of rows of peripheral ports arranged adjacent to each other having valves or spring bands covering the same are an advantage over a single or isolated port, in that the fluid discharging from one port from under its spring band or valve is directed toward and tends to impinge against the adjacent spring band or valve or deflect the discharge from the adjacent port against said spring band, keeping the same clean. This mutual action or reaction tends to keep adjacent spring bands cleaner than they would be otherwise, also the seating of the edges of the spring band on the peripheral port prevents the same from wearing out of shape. These bands are preferably formed of spring steel, are highly resilient, and are each split at one point, as shown particularly in Fig. 2, so as to be able to expand and contract, like a hoop. They are finished (by grinding or otherwise) to a true inner surface, so as to be able to fit tightly against their seats, on the outer surface of the bushing 1. At intervals, said bushing or case is provided with lugs 5 which overlap the band-springs 3, so as to retain these bands in place and prevent their escape. End-retaining means are also provided for such bands, such end-retaining means, in the construction shown comprising headed screws 6, the ends of which overlap the ends of said bands, the ends of the bands seating on a stop bridge.

It is obvious that slight increase in pressure within the valve cage, as compared with the external pressure, will cause the bands 3 to open, so permitting passage of air or other fluid through ports 2 from the inside of the valve cage outward; and, conversely, that upon restoration of pressure equilibrium the bands will close, and will close yet more tightly if the pressure upon the exterior of the cage be greater than the pressure within. It is also obvious that, if the valves be thin (as shown) the pressure differential required to open or close the valves will be very small indeed.

It will also be obvious that each valve cage may have as many rows of valve ports 2, and as many valve-bands 3, as desired, and therefore that each valve cage may present a very large port area, as compared with its own cross-sectional area.

Various fields of use for valves such as shown in Figs. 1–4 will occur to the engineer; but one important use for such valves is in blowing engines. In that type of compressor, which works at very low pressure and handles very large volumes of air, the inlet and discharge valves are commonly placed in the cylinder head itself. My valve is especially adapted for such use, and, conveniently, the inlet and discharge valves may be arranged in relatively concentric pairs. This is illustrated in Fig. 5, in which Figs. 7 and 8 designate, respectively, inlet and discharge valves, arranged concentrically, and each of the general construction previously described; that is to say, each of said valves comprises a ported valve cage and spring valve bands for the ports of that cage.

Fig. 6 shows another arrangement of inlet and discharge valves for compressors, pumps, etc., the arrangement being more nearly analogous to conventional arrangements of inlet and discharge valves for compressors, etc. The pump cylinder shown in this figure is double acting, and comprises, in addition to the usual cylinder 9, a valve chest 10, connected to the pump cylinder by the usual ports 11 and 12. 13, 13 are inlet valves, and 14, 14 are discharge valves; the inlet valves opening by suction in the engine cylinder to admit air or other fluids, and the discharge valves opening by excess of pressure in the cylinder to permit discharge into a receiver space 15.

What I claim is:—

1. A valve comprising a cage having a row of peripheral ports, and a spring valve-band held in seating proximity to such row of ports and adapted to expand upon creation of a pressure differential in one direction with respect to said ports, and to contract upon creation of a pressure differential in the other direction with respect to such ports, said cage having one or more projecting ribs provided with lugs overlapping said band and serving to retain the same.

2. A valve comprising a cage having a row of peripheral ports, and a spring valve-band surrounding such row of ports and held in seating proximity with respect thereto and adapted to expand upon creation of a pressure differential in one direction with respect to said ports, and to contract upon creation of a pressure differential in the other direction with respect to such ports, said cage having one or more projecting ribs provided with lugs overlapping said band and serving to retain the same.

3. A valve comprising a cage having a row of peripheral ports, and a split spring valve-band held in seating proximity to such row of ports, said band adapted to expand and contract with varying pressure differential, said cage provided with means for holding said band in place, and with means for holding down the ends of said band.

In testimony whereof I have signed this specification in the presence of two subscribing witnesses.

LEON WYGODSKY.

Witnesses:
H. M. MARBLE,
PAUL H. FRANKE.